US009284039B2

United States Patent
Maenz (10) Patent No.: US 9,284,039 B2
(45) Date of Patent: Mar. 15, 2016

(54) RUDDER SYSTEM FOR AN AIRCRAFT (71) Applicant: Airbus Operations GmbH, Hamburg (DE)

(72) Inventor: Christian Maenz, Hamburg (DE)

(73) Assignee: Airbus Operations GmbH (DE)

( * ) Notice: Subject to any disclaimer, the term of this patent is extended or adjusted under 35 U.S.C. 154(b) by 278 days.

(21) Appl. No.: 13/891,345

(22) Filed: May 10, 2013

(65) Prior Publication Data

US 2013/0320137 A1    Dec. 5, 2013

Related U.S. Application Data (63) Continuation of application No. PCT/EP2011/069163, filed on Oct. 31, 2011.

(60) Provisional application No. 61/412,944, filed on Nov. 12, 2010.

(30) Foreign Application Priority Data

Nov. 12, 2010 (DE) .......................... 10 2010 051 216

(51) Int. Cl.
  *B64C 9/00* (2006.01)
  *B64C 9/02* (2006.01)
  *B64C 5/06* (2006.01)
  *B64C 13/42* (2006.01)

(52) U.S. Cl.
  CPC ... *B64C 9/02* (2013.01); *B64C 5/06* (2013.01); *B64C 13/42* (2013.01); *Y02T 50/44* (2013.01)

(58) Field of Classification Search
  None
  See application file for complete search history.

(56) References Cited

U.S. PATENT DOCUMENTS

| 3,666,211 | A  | * | 5/1972  | Cathers et al. ................. 244/54 |
| 4,181,275 | A  | * | 1/1980  | Moelter et al. ............... 244/213 |
| 4,448,372 | A  | * | 5/1984  | Larson ............................ 244/87 |
| 4,531,448 | A  |   | 7/1985  | Barnes |
| 5,791,596 | A  |   | 8/1998  | Gautier et al. |
| 6,206,329 | B1 |   | 3/2001  | Gautier et al. |
| 6,257,528 | B1 | * | 7/2001  | Brislawn ....................... 244/211 |
| 8,172,174 | B2 | * | 5/2012  | Hejda .......................... 244/99.2 |
| 8,205,834 | B2 | * | 6/2012  | Maenz ........................ 244/123.4 |
| 8,584,610 | B1 | * | 11/2013 | Townsend .................... 114/162 |
| 8,602,356 | B2 | * | 12/2013 | Maenz ........................ 244/123.4 |
| 2007/0114328 | A1 | * | 5/2007 | Lacy et al. .................. 244/34 R |
| 2007/0114329 | A1 | * | 5/2007 | Lacy et al. .................. 244/34 R |
| 2008/0001037 | A1 | * | 1/2008 | Cox et al. .................... 244/221 |
| 2008/0203228 | A1 | * | 8/2008 | Maenz ........................ 244/123.7 |
| 2009/0050748 | A1 | * | 2/2009 | Ferraz .......................... 244/234 |

(Continued)

FOREIGN PATENT DOCUMENTS

| EP | 763465 A1 | 3/1997 |
| GB | 747507 A | 4/1956 |
| WO | 01/05654 A2 | 1/2001 |

*Primary Examiner* — Medhat Badawi
(74) *Attorney, Agent, or Firm* — Lerner, David, Littenberg, Krumholz & Mentlik, LLP (57) ABSTRACT

A rudder system for an aircraft includes a center box, a rudder and actuators, wherein the rudder is pivoted around a hinge line relative to the center box. The actuators are arranged at an acute angle relative to the hinge line, and connected with at least one pivoted pivot lever, wherein the pivot lever is fastened to the rudder by way of a first push rod. This provides considerably more installation space in a vertical stabilizer of an aircraft for a center box, so that the latter can comprise a distinctly smaller wall thickness than usual in prior art to absorb air load-induced torsion and bending stresses.

4 Claims, 9 Drawing Sheets

(56) References Cited

U.S. PATENT DOCUMENTS

| | | |
|---|---|---|
| 2009/0090816 A1 | 4/2009 | Gomes |
| 2009/0159755 A1* | 6/2009 | Gonzalez Gozalbo et al. ............... 244/215 |
| 2010/0019083 A1* | 1/2010 | Llamas Sandin et al. . 244/99.14 |
| 2010/0089053 A1* | 4/2010 | Hanlon et al. ................. 60/545 |
| 2010/0096497 A1 | 4/2010 | MacGregor |
| 2010/0116928 A1* | 5/2010 | Cerne ............................ 244/87 |

* cited by examiner

RUDDER SYSTEM FOR AN AIRCRAFT

CROSS-REFERENCE TO RELATED APPLICATIONS

The present application is a continuation of International Application No. PCT/EP2011/069163, filed Oct. 31, 2011, which claims priority from German Patent Application No. 10 2010 051 216.8 filed Nov. 12, 2010 and U.S. Provisional Patent Application No. 61/412,944 filed Nov. 12, 2010, the disclosures of which are hereby incorporated herein by reference.

TECHNICAL FIELD

The invention relates to a rudder system on an aircraft, an aircraft as well as the use of a pivot lever with an actuator movably arranged on the pivot lever for moving a rudder of an aircraft.

BACKGROUND OF THE INVENTION

A vertical stabilizer in prior art usually consists of a centre box, a nose edge that is arranged on the centre box and aligned in the flow, and a rudder that is arranged on the opposing side of the centre box and pivoted around a hinge axis. Given a deflection of the rudder, the vertical stabilizer is exposed to air loads independently of the rudder angle, which lead to a torsion moment and bending moment. In order to roughly determine these moments on the centre box, a pressure point is assumed for the centre box, at which all air loads converge to exert a point force. Based on this assumption, it becomes clear that the magnitudes of the torsion and bending moments depend on an aerodynamically predetermined sweep angle of the vertical stabilizer, since as the sweep angle grows, so too does the distance between the pressure point and a midpoint on a centre box surface directed toward the aircraft fuselage. In transonic aircraft, the sweep angle is especially pronounced, and very high torsion and bending moments may arise in particular in larger commercial aircraft with very large rudder areas, which have to be completely absorbed by the centre box from a mechanical standpoint.

The centre box is dimensioned subject to several boundary conditions, which encompass not only aerodynamic, but also mechanical and geometric limitations, resulting from the arrangement of rudder actuators in the vertical stabilizer. In particular given large rudders with a prescribed hinge axis, actuators arranged perpendicular to the hinge axis, and the necessary actuator size, this may place tangible limitations on the space available for a centre box.

US 2010/0096497 A1 depicts several variations of drive kinematics for rudders, which reveal claddings for rudder actuators that are effective in terms of structural mechanics, and may mechanically shift as the rudder moves.

In addition, EP 763 465 B1 and U.S. Pat. No. 6,206,329 B1 show a typical arrangement of three actuators, which together move a rudder pivoted around a hinge axis.

BRIEF SUMMARY OF THE INVENTION

In the usual configuration for the centre box of a vertical stabilizer, which has limited available space due to aerodynamic and mechanical boundary conditions, a rather small cross section necessitates the use of relatively thick sheet metal, so that these centre boxes may comprise a considerable weight. While the arrangement of a cladding active in terms of structural mechanics and able to follow a rudder motion could relieve the load on a centre box or other components in the vertical stabilizer, it is mechanically complicated, and thus production and cost-intensive, and when combined with the thicker design of the sheet metal in a cladding would not economize on weight in a major way.

Therefore, an aspect of the invention proposes a rudder system that permits as lightweight a centre box as possible, while simultaneously providing for a sufficiently high stiffness and stability, which preferably is at least on a par with those of a conventionally configured centre box. Such a rudder system preferably has a simple mechanical design, and in particular comprises the fewest possible additional components, which are also preferably immovable.

An aspect of the invention involves arranging the rudder-moving actuators at an acute angle relative to the hinge line, and not perpendicular to the hinge line, as is usually the case. This acute angle is preferably 0°, so that the actuators are arranged parallel to the hinge line. This is enabled by a pivot lever, which is attached to the rudder, pivoted to the centre box, and set up to redirect a force exerted by the actuators toward the rudder. As a consequence, the installation space required for the actuators is not excessively expanded by a component running perpendicular to the hinge line. Since vertical stabilizers usually comprise a relatively flat shape, clearly extending from one aircraft fuselage with a component running toward the vertical axis of the aircraft, the vertical, i.e., having a directional component parallel to the vertical axis of the aircraft, has enough space to accommodate an actuator arranged essentially perpendicular, upright and roughly parallel to the hinge axis. Given an unchanged position and alignment of the hinge line of the rudder, this actuator arrangement helps to again free up some of the space between the centre box and hinge line that is unusable in prior art, which may then be utilized according to an aspect of the invention for a larger geometric extension of the centre box along the longitudinal axis of the aircraft. In light of the clearly increased space available for a centre box, its wall thickness may be tangibly reduced, while maintaining a constant polar section modulus.

This finally results in a clear reduction in weight by comparison to the conventional centre boxes of vertical stabilizers known from prior art.

The components necessary for fabricating the rudder system according to an embodiment of the invention are very simple in nature, with only the pivot lever being incorporated into the rudder system as an additional, moving element. Since such pivot levers are mechanically mature and sufficiently reliable, practically no additional measures are needed to ensure the usual reliability of a rudder system.

The weight reduction effect may be estimated with the following calculation. For this purpose, we proceed from a simplified centre box having a rectangular profile with thin walls exposed to a bending and torsion load. The torsion stress essential to dimensioning may be calculated with $$\tau_t = \frac{M_t}{W_t},$$

wherein $M_t$ stands for the acting torsion moment, and $W_t$ for the polar section modulus of the centre box. The simplification to a thin-walled rectangular profile makes it possible to calculate the polar section modulus $W_t$ with the following equation:

$$W_t = \frac{2 \cdot t_1 t_2 l_1^2 l_2^2}{l_1 \cdot t_1 + l_2 \cdot t_2},$$

wherein $l_1$ and $l_2$ are edge lengths of the rectangular profile, and $t_1$ and $t_2$ are the respective accompanying thickness of the walls with edge lengths $l_1$ and $l_2$.

If $l_2$ is increased by a factor f, and the accompanying thickness $t_2$ of the edge with edge length $l_2$ is simultaneously decreased by the same factor, and the cross sectional area is held constant, an enlarged section modulus is obtained:

$$W_{t,new} = \frac{2 \cdot \frac{t_2}{f} \cdot t_1 l_1^2 (f \cdot l_2)^2}{l_1 \cdot t_1 + (f \cdot l_2) \cdot \frac{t_2}{f}} \Rightarrow W_{t,new} = f \cdot W_t$$

Conversely, $t_1$ and $t_2$ may also be reduced while keeping the section modulus $W_t$ unchanged and reducing the torsion stress owing to the larger possible edge length $l_{1, new}$ achieved through the perpendicular arrangement of the actuators. This doubles the effect in terms of economizing on weight.

In an advantageous embodiment, the actuators extend parallel to the hinge axis, the spatial position of which depends on the sweep angle of the vertical stabilizer. The fact that the latter is usually greater than 0° provides an installation space for the actuators that extends in the form of the hypotenuse of a right-angled triangle over a greater distance than the adjacent side associated with the sweep angle in the form of the height of the vertical stabilizer.

In an advantageous embodiment of the invention, the pivot lever comprises two legs standing at an angle in relation to each other, as well as a pivot point arranged in the vertex, on which the pivot lever is mounted so that it may pivot relative to the centre box. Each end of the actuator is rotatably connected with a leg of the pivot lever, while the other leg is joined with a first push rod that is fastened to the rudder. This mechanical construction is very simple and reliable, the pivot lever-push rod combination making it resemble a relatively large rudder lever, and enables the reliable operation of the perpendicularly arranged actuator. Although the angle between the two legs may measure 90° in the simplest case, this is not necessary as long as the function according to the invention may also be satisfied with pivot levers having alternative leg angles.

In another, equally advantageous embodiment of the invention, each actuator is positioned so that it cannot rotate or pivot relative to the centre box, wherein the movable end of each actuator comprises a second push rod situated on the leg of the pivot lever facing the actuator. This makes it possible to achieve a balance between the linear motion of the actuator and rotational motion of the allocated leg of the pivot lever, reached by deflecting the thrust lever. As a result, the actuator may be mounted in a very reliable manner, with no swivel bearing exposed to a strong load being provided for an actuator, and the installation space required for the actuator receives a more compact configuration.

In an advantageous embodiment, the movable ends of two actuators are aligned toward each other, and engage a shared pivot lever. This makes it possible to economize on one pivot lever, so that the weight of the rudder system according to an embodiment of the invention may be reduced even further in comparison to prior art.

In an advantageous embodiment, the two movable ends of the actuators aligned toward each other engage the shared pivot lever by way of a second push rod. As a result, the two actuators aligned toward each other may also be immovably arranged inside the vertical stabilizer, thereby potentially economizing on space.

In another, equally advantageous embodiment, a first end of the actuator may be connected by means of a push rod to the structure of an aircraft to resemble a pendulum support, while its other end uses a pivot lever to move the end of a flange, which may be pivoted in the structure and is connected with the rudder. The end of the actuator mounted via a push rod is further joined by way of another push rod with a pivot lever, which may be rotatably mounted on the structure, and moves the other end of the flange. The rotational axis of the flange lies in a plane that runs at an angle to the plane in which the rotational axes of the pivot levers lie. The angle between these planes depends on the configuration of the vertical stabilizer, in particular its sweep angle, and preferably ranges from 60° to 90°. This arrangement makes it possible to economize significantly on installation space not just in the longitudinal direction, but also in the transverse direction.

Other embodiments of the invention include an aircraft equipped with such a rudder system, as well as actuators arranged parallel to a hinge line of a rudder for moving the rudders in combination with pivot levers.

BRIEF DESCRIPTION OF THE DRAWINGS

Additional features, advantages and possible applications of the present invention may be gleaned from the following description of the exemplary embodiments and figures. All described and/or graphically depicted features here constitute the subject matter of the invention, both separately and in any combination desired, even independently of their composition in the individual claims or back references thereto. The same reference numbers in the figures stand for the same or similar objects.

DETAILED DESCRIPTION

Figure 1A:
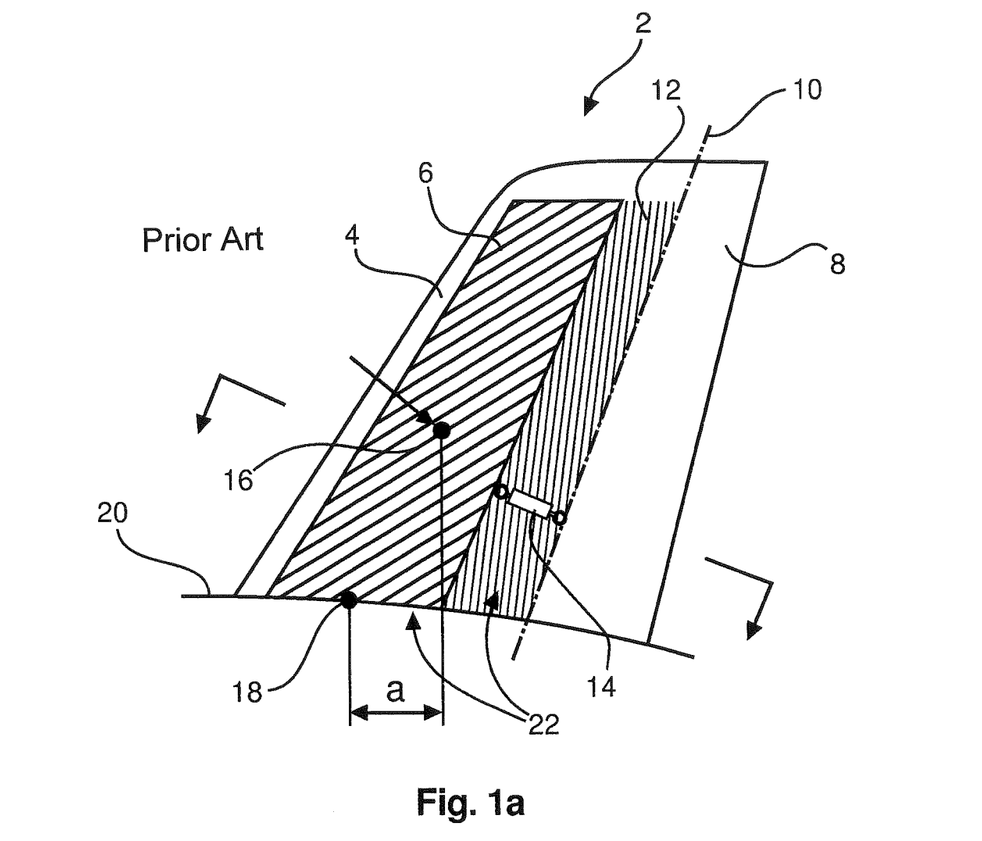
FIGS. 1a and 1b show a vertical stabilizer according to prior art.
Figure 1B:
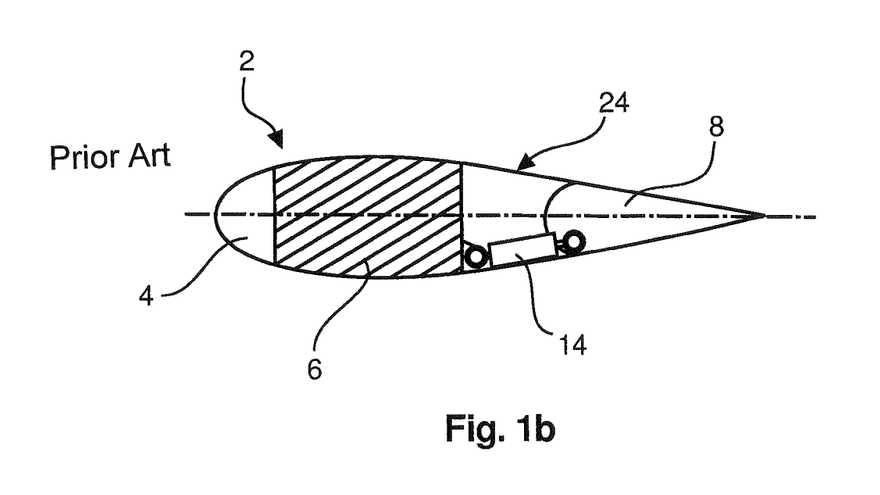

FIGS. 1a and 1b show a vertical stabilizer arrangement 2 according to prior art, with a nose edge 4, a centre box 6 and a rudder 8, which is mounted on a spar 12 of the centre box 8 so that it may pivot around a hinge line 10. The rudder 8 is deflected using several actuators 14, which are essentially arranged perpendicular to the hinge line 10. By moving the axis of the actuators 14 in and out, an eye of the rudder 8 may be pulled or pushed, thereby pivoting the rudder 8 around the rudder hinge line 10.

With the rudder 8 deployed, air loads arise that may be viewed as concentrated in an imagined pressure point 16 within the centre box 6. The distance marked "a" from a midpoint 18 to an area 22 of the centre box 6 directed toward an aircraft fuselage 20 to the pressure point 16 determines the torsion moment on the centre box 6. If this centre box 6 is designed as a thin-walled hollow body with a rectangular cross sectional area, its area moment of inertia or section modulus must be dimensioned in such a way that the torsion stresses in the centre box 6 do not exceed a permissible value.

As evident from FIG. 1b, an area 24 of the vertical stabilizer 2 prescribed by the arrangement of the actuator 14 is for the most part practically unused space, which is not utilized for accommodating air loads. As a consequence, the centre box 6 shown on FIGS. 1a and 1b comprises a relatively pronounced wall thickness, so that it may provide a sufficient polar section modulus given the available cross sectional area.

Figure 2A:
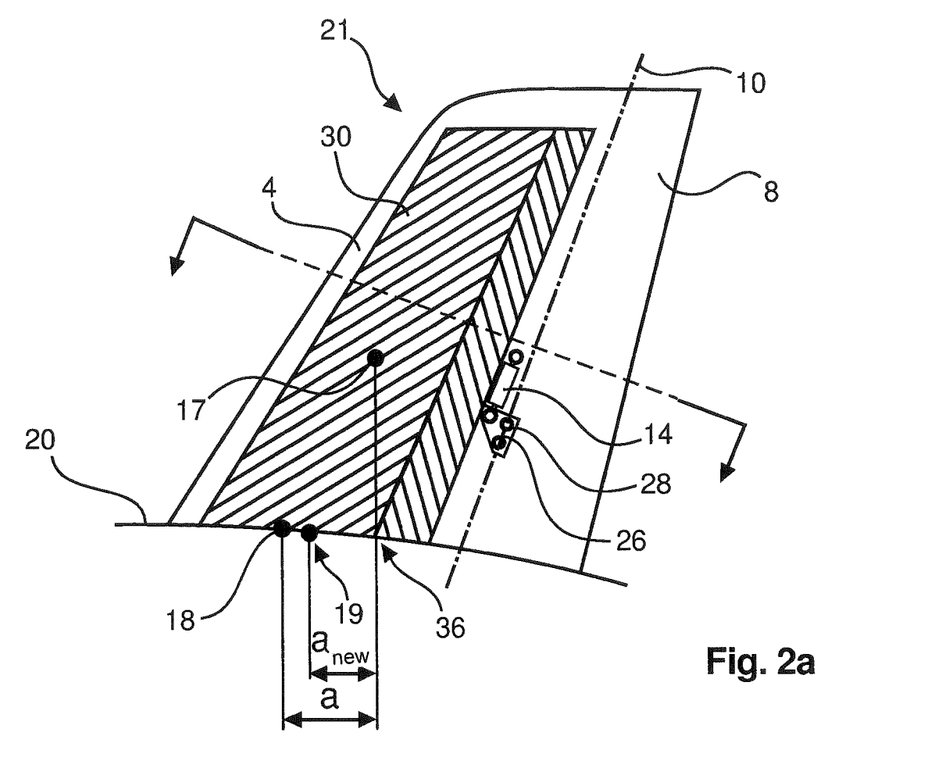
FIGS. 2a, 2b and 2c show a rudder system according to an embodiment of the invention as contrasted with prior art.
Figure 2B:
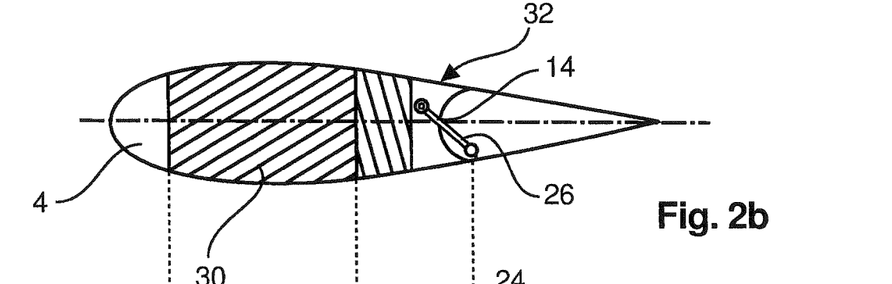
Figure 2C:
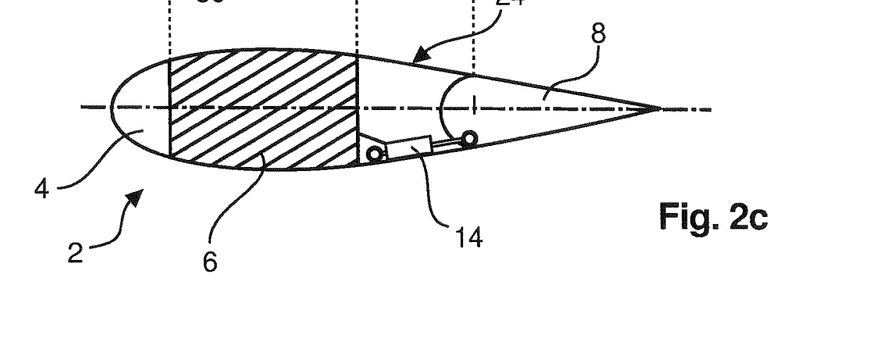

FIGS. 2a, 2b and 2c contrast a rudder system 21 according to an embodiment of the invention and a rudder system 2 according to prior art. As may be gleaned from FIG. 2a, the actuator 14 according to the invention is arranged parallel to the rudder hinge line 10 configured as prescribed by the flight mechanics, and diverts the movement of the actuator 14 by way of a pivot lever 26 mounted on a hinge point 28 so that it may move relative to the centre box 30, so that the rudder 8 may execute a desired rudder motion. Since the actuator 14 depicted on FIG. 2a is parallel to the hinge line 10, virtually none of the previously unused installation space in front of the hinge line 10 in the vertical stabilizer 32 is occupied, so that the centre box 30 may extend considerably more in the direction of the hinge line than the centre box 6 from FIGS. 1a and 1b. This is made evident by the direct comparison on FIG. 2b and FIG. 2c, in which the leading edge strip and respective front end of the centre box 6 and 30 of a rudder from prior art and the invention align with each other.

In addition to the size of the centre box 30, FIG. 2a also reveals that the distance between the midpoint 19 of an area 36 directed toward the aircraft fuselage 20 and a pressure point 17 for the arising air loads on the centre box 30 is smaller than the distance between the midpoint 18 and pressure point 16 of the centre box 6 from FIG. 2a. At a constant section modulus, this makes it possible to considerably diminish the wall thickness of the centre box 30, so that a centre box 30 at the same section modulus may comprise a lower weight than the centre box 6 from FIGS. 1a and 1b.

Figure 3:
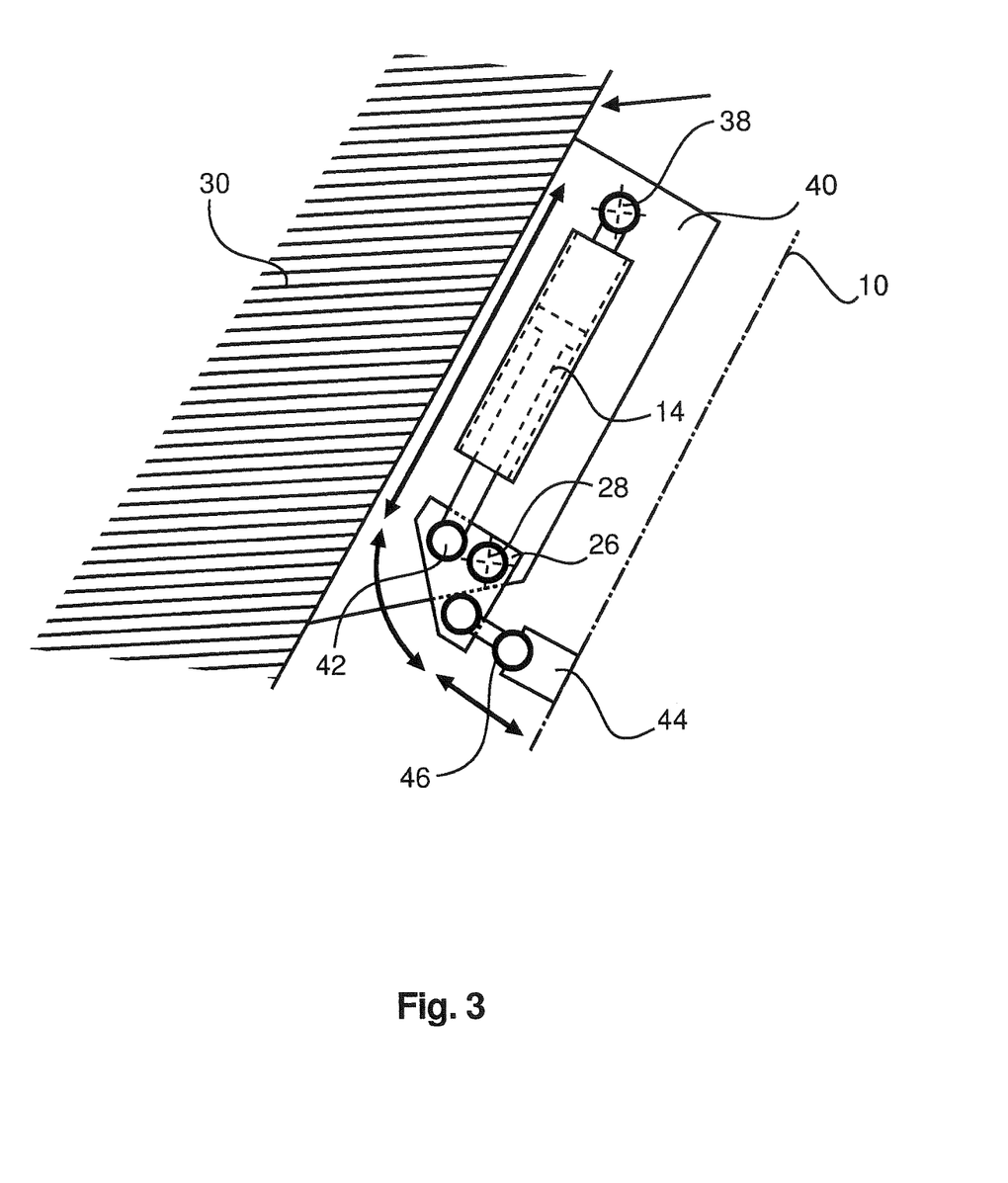
FIG. 3 shows a detailed view of an actuator arrangement in a rudder system according to an embodiment of the invention.

FIG. 3 shows a section of the rudder system 21 according to an embodiment of the invention, in which the actuator 14 comprises a bearing point 38 that is mounted on a flange 40 connected with the centre box 30. The pivot lever 26 is arranged at an end 42 lying opposite the bearing point 38, and its bearing point 28 is also pivoted to the flange 40. A rudder brace 44 on the rudder 8 is hinged with the pivot lever 26, so that the rudder 8 swivels around the hinge line 10 when the actuator 14 is deflected 14 in a direction parallel to the rudder hinge line 10.

Figure 4:
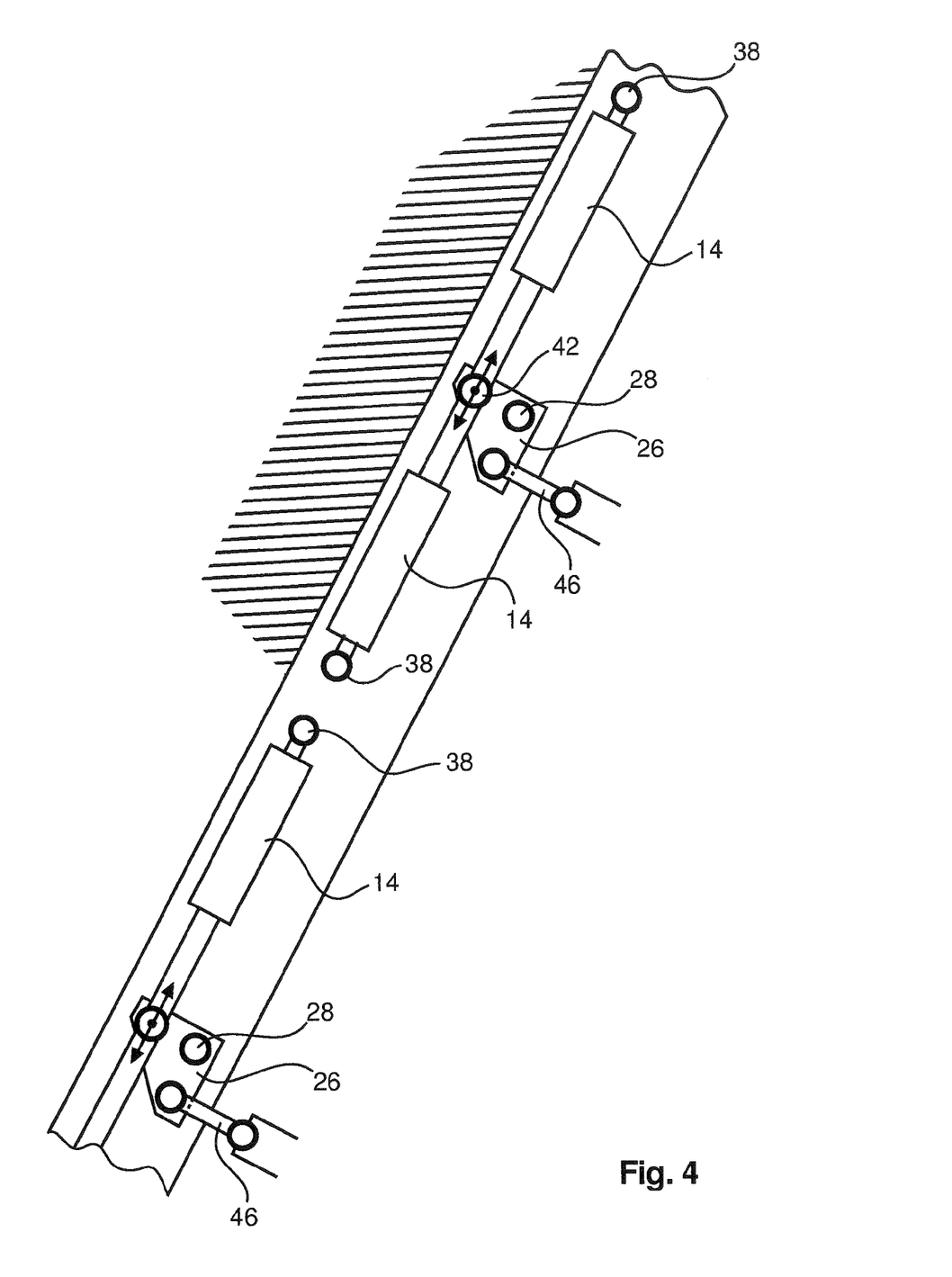
FIG. 4 shows a variation of the rudder system according to an embodiment of the invention.

FIG. 4 shows a possible further development involving the use of two or more groups each having two actuators 14, which engage shared pivot levers 26, wherein the two actuators 14 of one group are mirror inverted relative to each other. The use of two actuators 14 on one pivot lever 26 could make it possible to give the actuators a smaller piston cross section than a single actuator 14. In addition, should one actuator 14 in a group of two actuators 14 be defective, the other, still intact actuator 14 could at least partially compensate for any misalignment, jamming, or the like. Within the framework of the usual configuration of flight control systems, it also makes sense to hook up at least two of the depicted actuators 14 to different hydraulic systems, so that one of the actuators 14 remains functional given a failure of a hydraulic system. Similarly to the above, this may also be achieved with the individual groups of actuators 14, so that the groups of actuators 14 are interconnected with different hydraulic systems.

Figure 5:
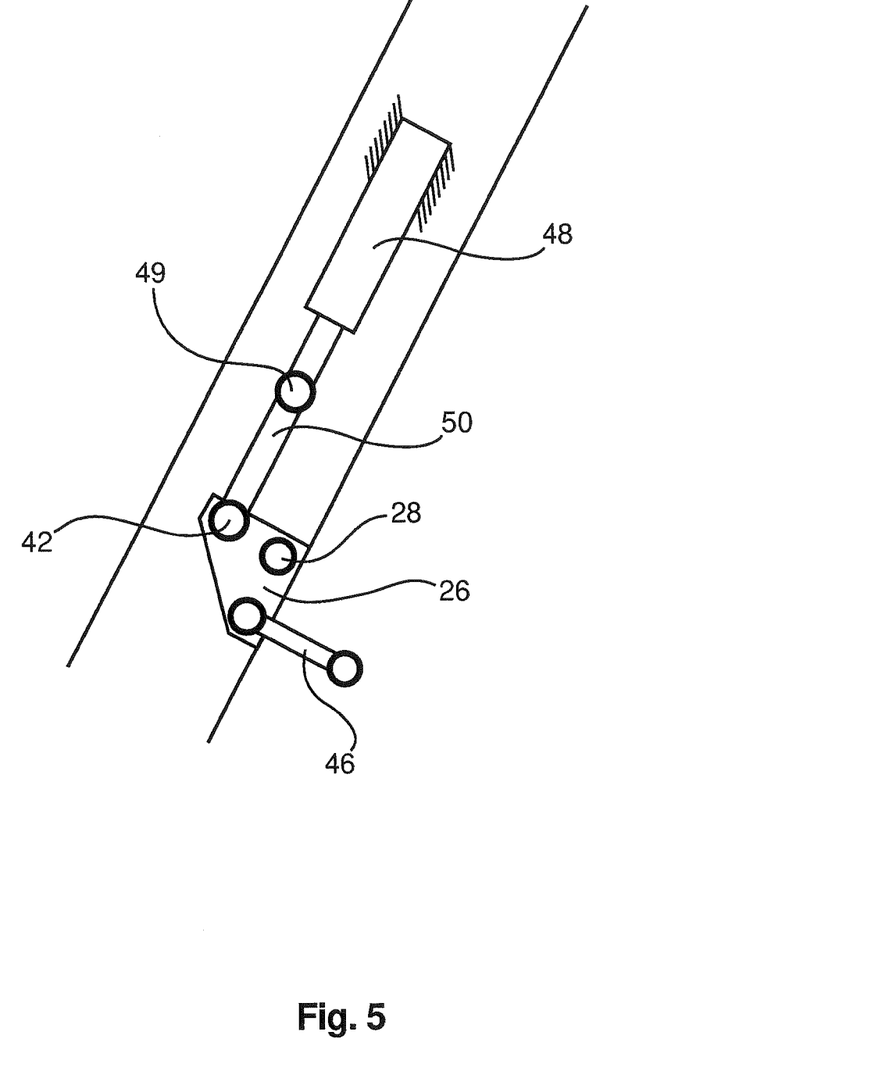
FIG. 5 shows another variation of the rudder system according to an embodiment of the invention.

FIG. 5 shows an actuator 48 that engages the pivot lever 26 by way of a second push rod 50. The advantage to the above is that the actuator 48 need not be suspended on a single bearing point, but rather may be completely rigidly and immovably mounted relative to the centre box 30. The second push rod 50 may bring about a balance between the exclusively linear movement of the end 42 of the actuator 48 and the accompanying rotating end of the pivot lever 26.

Figure 6:
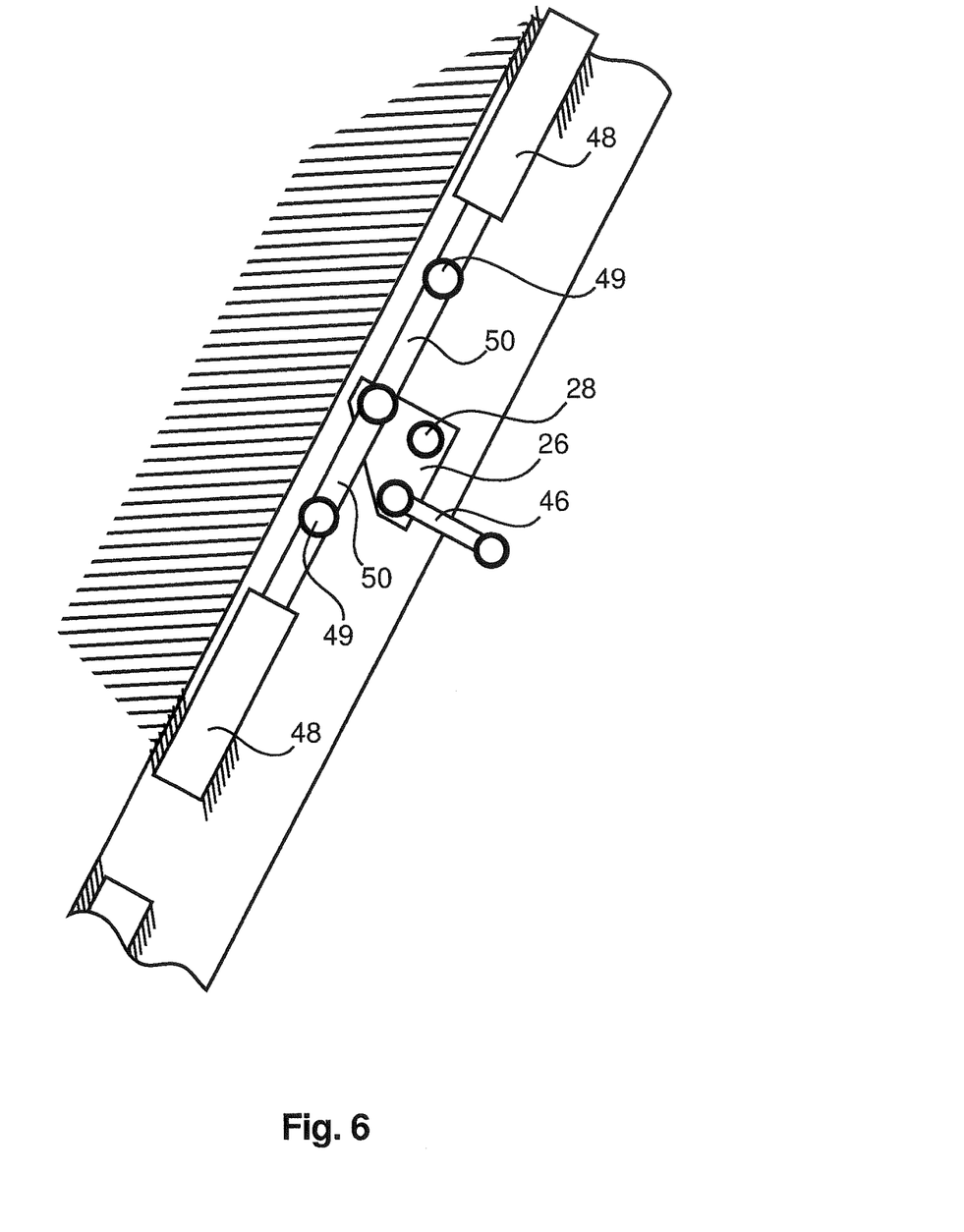
FIG. 6 shows another variation of the rudder system according to an embodiment of the invention.

As shown on FIG. 6, this may also be performed with an arrangement from FIG. 4 with two actuators 14 from a group of actuators 14 that are aligned toward each other, and each act on a shared pivot lever 26 by way of a second push rod 50.

Figure 7:
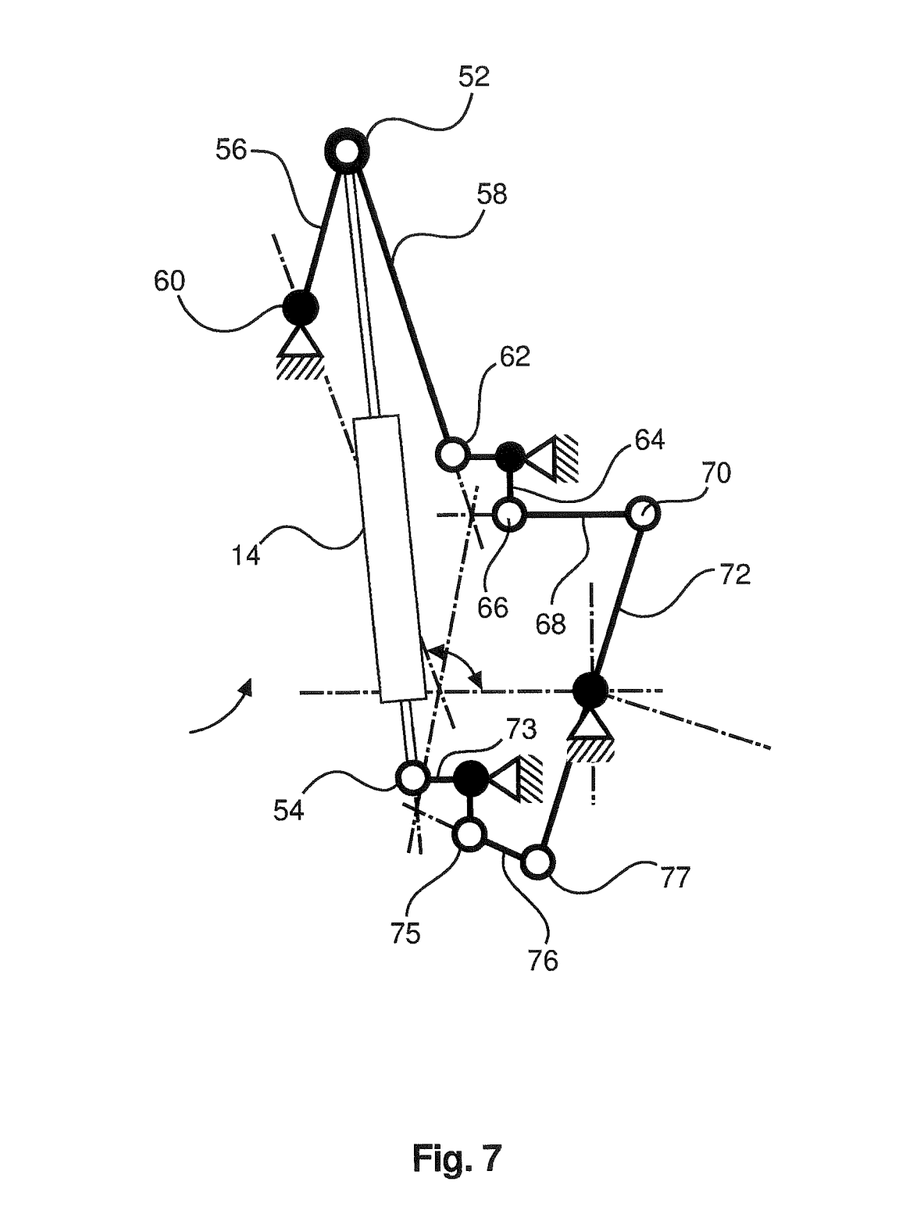
FIG. 7 shows a detailed view of another variation of the rudder system according to an embodiment of the invention.

The spatial, simplified depiction on FIG. 7 reveals another solution to shorten the lever arm necessary for moving the rudder 8. An actuator 14 is pivoted to a hinge 54, and presses on another hinge 52, to which are secured two push rods 56 and 58, which in turn are joined with a bearing point 60 and hinge 62. A pivot lever 64 is pivoted around a fixed bearing by way of a hinge 66 and hinge 62, and uses another push rod 68 and hinge 70 to move one end of a flange 72, which imparts its rotation to a rudder (not shown). The actuator 14 uses the hinge 54 to actuate a second pivot lever 73, which moves the other end of the flange 72 by way of a hinge 75, another push rod 76 and an additional hinge 77. As evident from FIG. 7, the pivot levers 64 and 73 are movably mounted on a structure of the aircraft, like the flange 72. The actuator 14 and flange 72 lie in two planes situated at an angle to each other, for example offset by 90° to each other. The kinematic chain of this arrangement may reduce the space required in both the transverse and longitudinal direction within the structure of a vertical stabilizer.

Figure 8A:
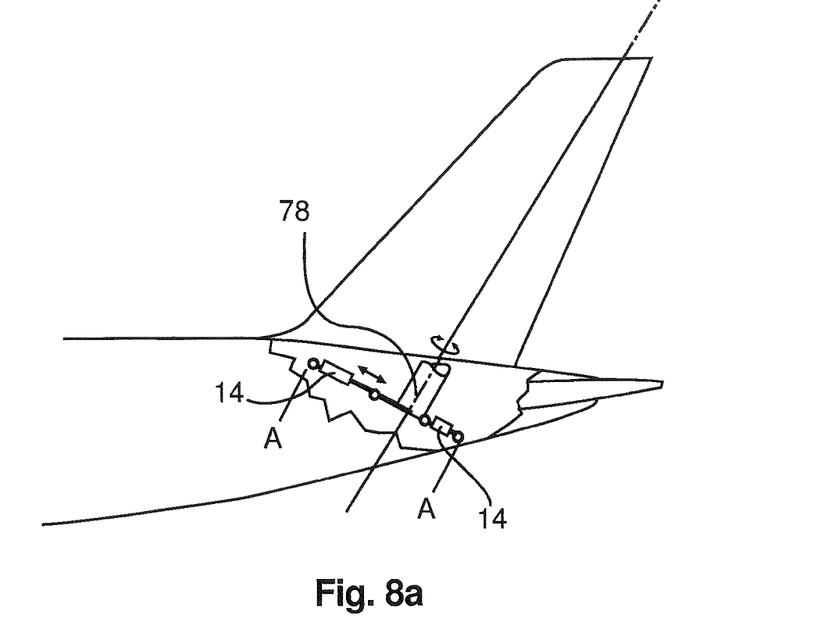
FIGS. 8a and 8b show another variation of the rudder system according to an embodiment of the invention.
Figure 8B:
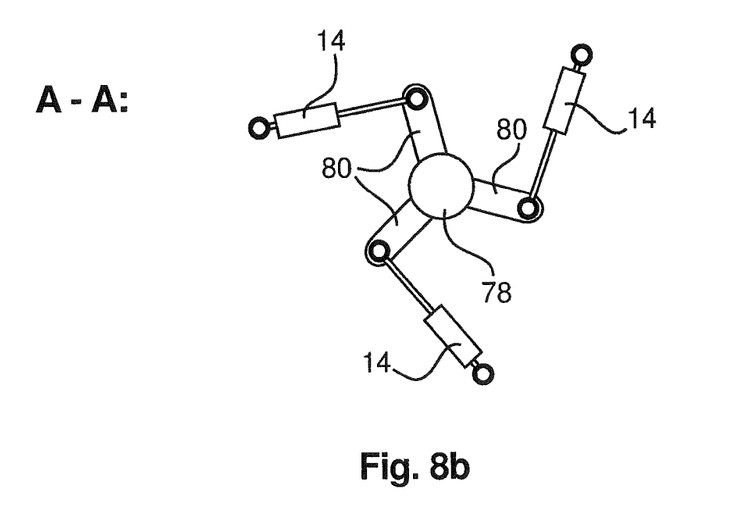

FIGS. 8a and 8b show an additional variant in which a shaft 78 joined with the rudder extends into the aircraft fuselage, to there be driven by actuators 14 with pivot levers 80. As a result, nearly no installation space in the vertical stabilizer is occupied, so that its centre box 16 may be given especially large dimensions, and may comprise a very small sheet thickness, and hence a low weight, at a constant polar section modulus.

A combination comprised of a shaft 78 and a hollow shaft enveloping this shaft 78 could lend itself to driving a two-part rudder, separately moving the individual rudder segments.

Figure 9:
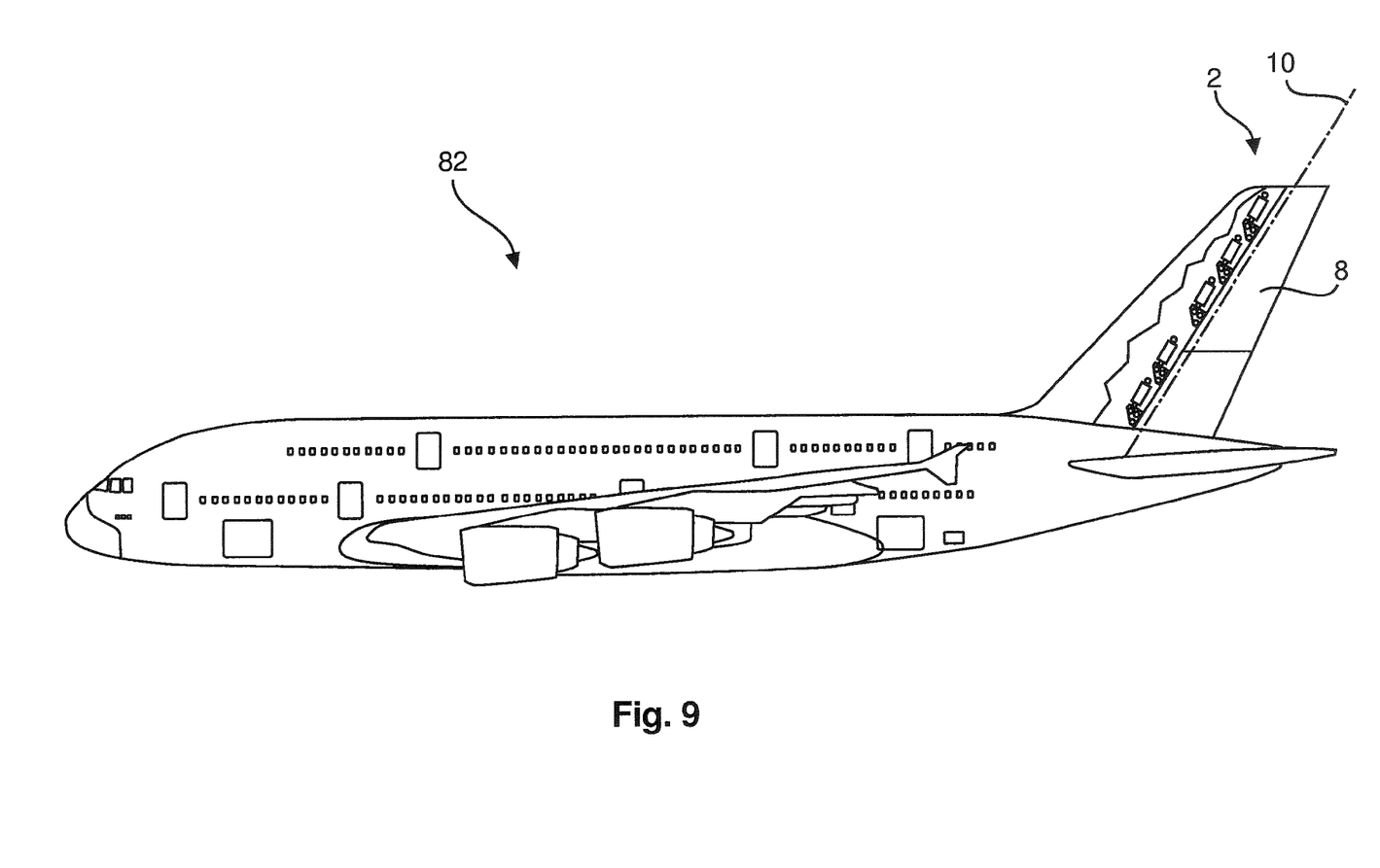
FIG. 9 shows an aircraft that comprises a rudder system according to an embodiment of the invention.

Finally, FIG. 9 shows an aircraft comprising a vertical stabilizer 52 with a rudder 8 that is pivoted around a hinge line 10 and comprises several actuators 14, which are aligned at an acute angle to the hinge line, and in particular parallel thereto.

Let it be noted in addition that "comprising" does not preclude any other elements or steps, and "a" or "an" do not rule out a plurality. Let it further be noted that features described with reference to one of the above exemplary embodiments may also be used in combination with other features from other exemplary embodiments described above. Reference numbers in the claims are not to be construed as a limitation.

The invention claimed is:

1. A rudder system for an aircraft, comprising:
a centre box;
a rudder; and
a plurality of actuators;
wherein the rudder is pivoted around a hinge line relative to the centre box, wherein the actuators are arranged at an acute angle relative to the hinge line, and connected with at least one pivoted pivot lever, and wherein a first end of one of the plurality of actuators is connected by a first push rod to an aircraft structure to resemble a pendulum support, and a second end is configured to use the at least one pivot lever to move an end of a flange, the flange being pivotable in the aircraft structure and connected with the rudder, wherein the first end of the actuator is joined by a second push rod with a second pivot lever, the second pivot lever rotatably mounted on the aircraft structure, and moving the other end of the flange.

2. The rudder system according to claim 1, wherein the pivot lever comprises first and second legs standing at an angle in relation to each other, and is mounted on a pivot point arranged in the vertex so that the pivot lever is pivotable relative to the centre box.

3. The rudder system according to claim 1, wherein the rotational axis of the flange lies in a plane running at an angle to the plane in which the rotational axes of the pivot levers lie.

4. The rudder system according to claim 3, wherein the angle between the planes comprising the rotational axes ranges from 60° to 90°.

* * * * *